US007725316B2

(12) United States Patent
Chengalvarayan et al.

(10) Patent No.: US 7,725,316 B2
(45) Date of Patent: May 25, 2010

(54) APPLYING SPEECH RECOGNITION ADAPTATION IN AN AUTOMATED SPEECH RECOGNITION SYSTEM OF A TELEMATICS-EQUIPPED VEHICLE

(75) Inventors: Rathinavelu Chengalvarayan, Naperville, IL (US); John J Correia, Livonia, MI (US); Scott M Pennock, Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 935 days.

(21) Appl. No.: 11/428,663

(22) Filed: Jul. 5, 2006

(65) Prior Publication Data

US 2008/0010057 A1    Jan. 10, 2008

(51) Int. Cl.
*G10L 19/14* (2006.01)
*G10L 15/04* (2006.01)
*G10L 15/06* (2006.01)

(52) U.S. Cl. .................. 704/234; 704/244; 704/251
(58) Field of Classification Search .................. None
See application file for complete search history.

(56) References Cited

U.S. PATENT DOCUMENTS

| | | | | |
|---|---|---|---|---|
| 5,604,839 | A * | 2/1997 | Acero et al. | 704/234 |
| 5,812,972 | A * | 9/1998 | Juang et al. | 704/234 |
| 6,456,697 | B1 * | 9/2002 | Chang et al. | 379/88.01 |
| 6,772,117 | B1 * | 8/2004 | Laurila et al. | 704/233 |
| 6,836,758 | B2 | 12/2004 | Bi et al. | |
| 7,024,359 | B2 * | 4/2006 | Chang et al. | 704/251 |
| 7,269,555 | B2 * | 9/2007 | Yuk et al. | 704/234 |
| 2002/0010581 | A1 * | 1/2002 | Euler et al. | 704/236 |
| 2007/0073539 | A1 | 3/2007 | Chengalvarayan et al. | |
| 2007/0129943 | A1 * | 6/2007 | Lei et al. | 704/240 |

FOREIGN PATENT DOCUMENTS

WO    WO 2005036525 A1 *    4/2005

OTHER PUBLICATIONS

Rathi Chengalvarayan, "Robust HMM Training for Unified Dutch and German Speech Recognition", 7th International Conference on Spoken Language Processing [ICSLP2002], Denver, CO, Sep. 16-20, 2002, http://www.isca-speech.org/archive, 4 pages.
Sabine Deligne and Satya Dharanipragada, "Enrollment in Low-Resource Speech Recognition Systems", IBM T.J. Watson Research Center, Yorktown Heights, NY, ICASSP 2004, 4 pages.

* cited by examiner

*Primary Examiner*—Matthew J Sked
(74) *Attorney, Agent, or Firm*—Anthony Luke Simon; Reising Ethington P.C.

(57) ABSTRACT

A speech recognition adaptation method for a vehicle having a telematics unit with an embedded speech recognition system. Speech is received and pre-processed to generate acoustic feature vectors, and an adaptation parameter is applied to the acoustic feature vectors to yield transformed acoustic feature vectors. The transformed acoustic feature vectors are decoded and a hypothesis of the speech is selected, and the adaptation parameter is trained using acoustic feature vectors from the hypothesis. The method also includes one or more of the following steps: the speech is observed for a certain characteristic and the trained adaptation parameter is saved in accordance with the certain characteristic for use in transforming feature vectors of subsequent speech having the certain characteristic; use of the trained adaptation parameter persists from one vehicle ignition cycle to the next; and use of the trained adaptation parameter is ceased upon detection of a system fault.

18 Claims, 4 Drawing Sheets

APPLYING SPEECH RECOGNITION ADAPTATION IN AN AUTOMATED SPEECH RECOGNITION SYSTEM OF A TELEMATICS-EQUIPPED VEHICLE

TECHNICAL FIELD

This invention relates to speech signal processing and, more particularly, to automated speech recognition (ASR).

BACKGROUND OF THE INVENTION

ASR technologies enable microphone-equipped computing devices to interpret speech and thereby provide an alternative to conventional human-to-computer input devices such as keyboards or keypads. A typical ASR system includes several basic elements. A microphone and acoustic interface receives a user's speech and digitizes it into acoustic data. An acoustic pre-processor parses the acoustic data into information-bearing acoustic features. A decoder then uses acoustic models to decode the acoustic features and generate several hypotheses, and can include decision logic to select a best hypothesis of subwords and words corresponding to the users' speech.

In one implementation, vehicle telecommunications devices are equipped with voice dialing features to initiate a telecommunication session. Such voice dialing features are enabled by ASR technology to detect the presence of discrete speech such as a spoken command or spoken control words. For example, a user can initiate a phone call using an ASR-equipped telephone by speaking a command such as "Call" and then speaking digits of a telephone number to be dialed. Ideally, the ASR system performs well regardless of the particular user, the user's dialect, the user's gender, and any ambient noise in the environment in which the ASR system is used.

ASR systems typically include ASR adaptation routines in an attempt to train the ASR system for better performance despite differences in user, user gender, user dialect, or environmental conditions. Using model adaptation techniques, acoustic models are transformed with an adaptation parameter to better match incoming acoustic feature vectors. Conversely, using run time adaptation (RTA) techniques, acoustic feature vectors are transformed with an adaptation parameter to better match acoustic models. Conventional ASR adaptation routines are initialized with default identity matrix parameters, which are independent of user or environmental characteristics. Unfortunately, however, conventional ASR adaptation often requires users to excessively repeat training utterances to train the adaptation parameters to the particular user and to ambient environmental characteristics. Such repetition can frustrate the users.

SUMMARY OF THE INVENTION

According to one aspect of the present invention, there is provided a speech recognition method for a vehicle having a telematics unit with an embedded speech recognition system, comprising the steps of:

(a) receiving speech;

(b) pre-processing a segment of the speech to generate acoustic feature vectors;

(c) applying at least one adaptation parameter to the acoustic feature vectors to yield transformed acoustic feature vectors;

(d) decoding the transformed acoustic feature vectors to select a hypothesis therefrom corresponding to the received speech; and (e) training the at least one adaptation parameter with acoustic feature vectors of the selected hypothesis to yield at least one trained adaptation parameter.

The speech recognition method also includes one or more of the following additional steps:

observing the speech for a certain characteristic and saving the at least one trained adaptation parameter in accordance with the certain characteristic for use in transforming feature vectors of subsequent speech having the certain characteristic;

continuing use of the at least one trained adaptation parameter from one vehicle ignition cycle to the next such that the trained adaptation parameter persists; or ceasing use of the trained adaptation parameter upon detection of a system fault.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
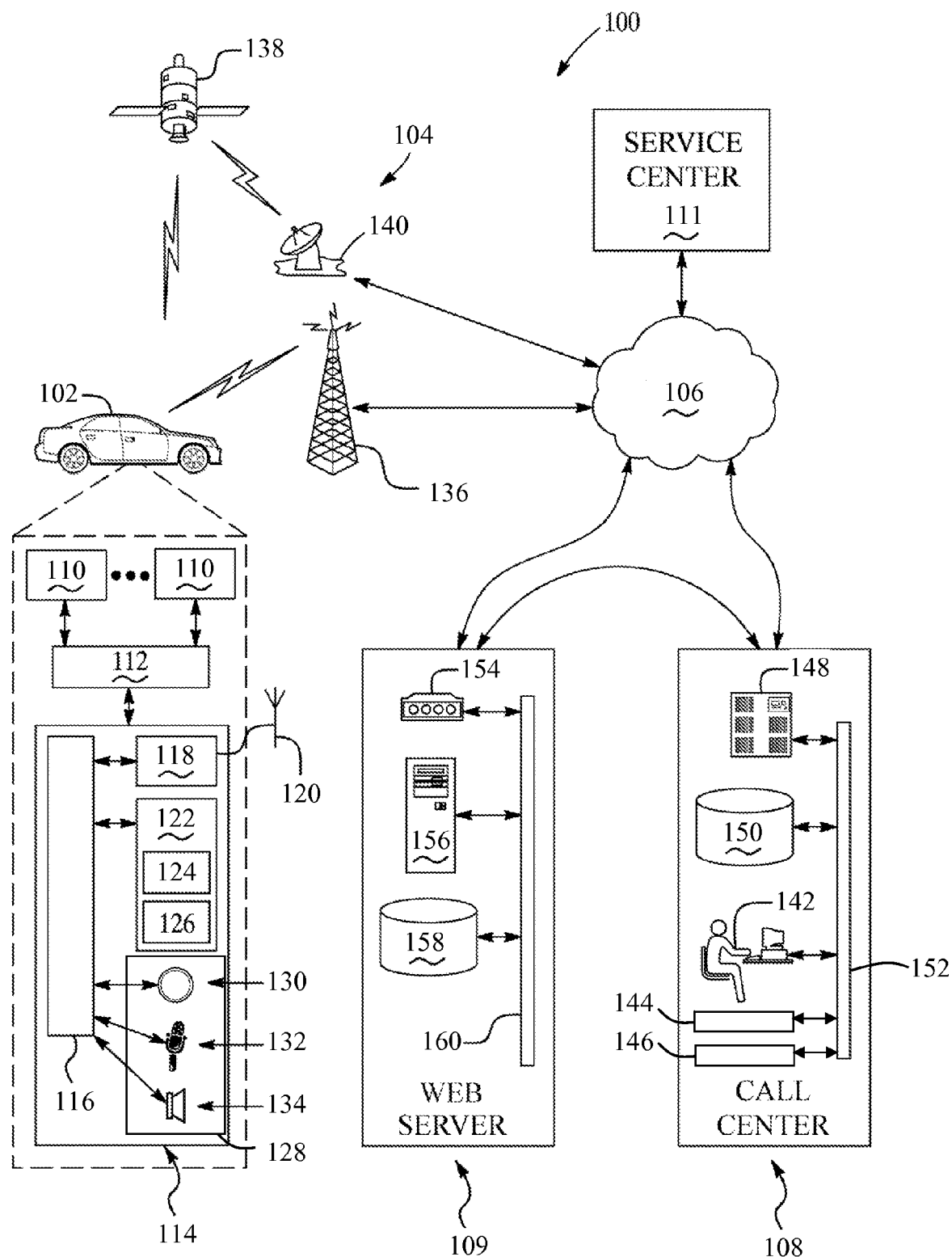
FIG. 1 is a block diagram depicting an example of a telematics system that can be used to implement exemplary methods of speech recognition.
Figure 2:
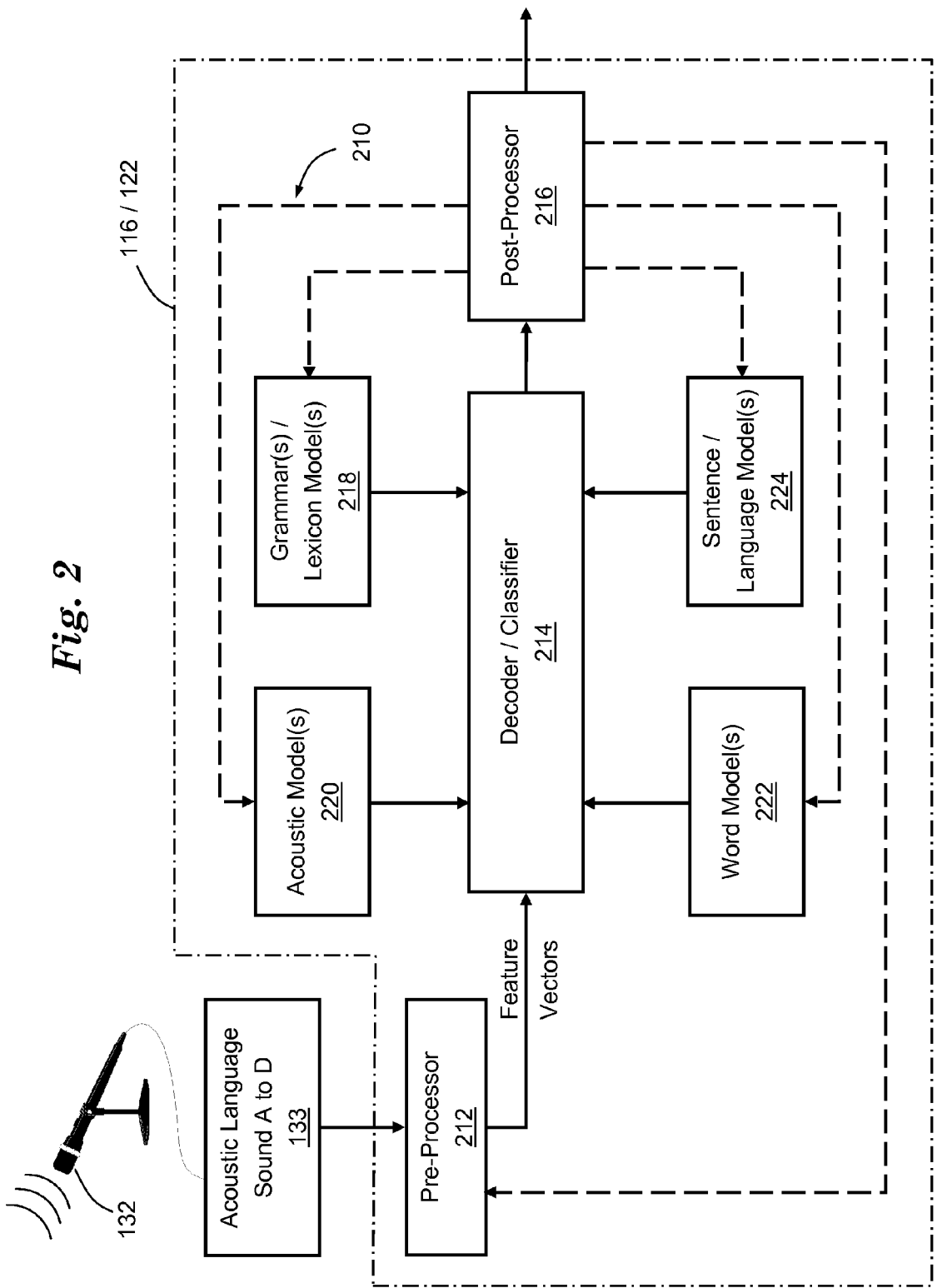
FIG. 2 is a block diagram illustrating an example ASR architecture that can be embedded within the telematics system of FIG. 1 and used to implement exemplary methods of speech recognition.

An exemplary operating environment enabled with automated speech recognition (ASR) is illustrated in FIGS. 1 and 2, and can be used to implement exemplary embodiments of methods of speech recognition adaptation. The methods can be particularly useful for voice dialing applications, voice activated web browsing applications, or the like. The methods can include speech recognition generally and improved applications of speech recognition adaptation, and are discussed in detail further below in conjunction with FIGS. 3 and 4.

The methods can be carried out using any suitable ASR-enabled system. Preferably, however, the methods are carried out in conjunction with an ASR-enabled telematics system 100, which can include a motor vehicle 102 carrying one or more occupants or users, a wireless communication system 104 for wirelessly communicating with the vehicle 102 and a second communications system 106 that, in turn, communicates with a call center 108 that provides services to the vehicle 102 by processing and storing data and communicating with the vehicle 102. Additionally, the telematics system 100 can also include a web server 109 in communication with the vehicle 102 and call center 108 for providing Internet services thereto, and a vehicle service center 111 in communication with the aforementioned elements to provide services to the vehicle 102.

The exemplary telematics system 100 generally facilitates numerous services to the occupant(s) of the vehicle 102, including vehicle navigation, turn-by-turn driving directions, telephony including automated audio interaction with the occupant, emergency services, vehicle diagnostics, vehicle system updates, and ASR. For this purpose the telematics system 100 processes data and instructions as well as facilitates wireless voice and data transfer between hardware located on the vehicle 102 and hardware in the remote call center 108. For example, the telematics system 100 enables the vehicle occupant to initiate voice communication, for example, with the call center 108 or the service center 111. Also, the telematics system 100 enables electronic communication between the vehicle 102 and the web server 109 for various purposes such as transmitting and/or receiving information such as updated voice messages, email, news, or the like.

Motor Vehicle

The motor vehicle 102 is depicted in the illustrated embodiment as a passenger vehicle, and it will be appreciated that any other mobile vehicles including marine vehicles, aircraft, and other automobiles such as vans, trucks, etc., can be used without departing from the scope of the invention. Various electronic modules can be located on the vehicle 102 and include one or more vehicle sub-systems or vehicle system modules (VSMs) 110, an on-board vehicle communication bus 112, and one or more vehicle telematics units 114 connected by the bus 112 to the VSMs 110.

VSMs

The VSMs 110 facilitate suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent all of the subsystems throughout the vehicle with which the telematics unit 114 interacts. In a specific example, if the call center 108 sends a signal to the vehicle 102 to unlock the vehicle doors, then the telematics unit 114 instructs a door lock VSM to unlock the doors.

Vehicle Communication Bus

The vehicle communication bus 112 facilitates interactions among the various vehicle systems such as the VSMs 110 and the telematics unit 114 and uses any suitable network communication configuration, such as a Controller Area Network (CAN), Media Oriented System Transport (MOST), Local Interconnect Network (LIN), Ethernet (10 base T, 100 base T), Local Area Network (LAN), ISO Standard 9141, ISO Standard 11898 for high-speed applications, ISO Standard 11519 for lower speed applications, SAE Standard J1850 for high-speed and lower speed applications, and/or the like.

Vehicle Telematics Unit

The vehicle telematics unit 114 facilitates communication and interactivity between the vehicle 102 or occupant thereof, and various remote locations including the call center 108, web server 109, and/or and service center 111. The telematics unit 114 interfaces with the various VSM's 110 via the vehicle communication bus 112. The telematics unit 114 can be implemented in any suitable configuration and preferably includes a processor 116, a communications device 118 for wireless communication to and from the vehicle 102 via one or more antennas 120, a memory 122 to store programs 124 and/or one or more databases 126, and a user interface 128. The telematics unit 114 also includes any suitable device for intercommunicating the aforementioned devices.

Telematics Processor

The telematics processor 116 is implemented in any of various ways known to those skilled in the art, such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices (not shown) such as a real time clock to provide accurate date and time information. The processor 116 executes the one or more computer programs 124 stored in memory 122, such as to carry out various functions of monitoring and processing data and communicating the telematics unit 114 with the VSM's 110, vehicle occupants, and remote locations. For example, the processor 116 executes one or more speech recognition programs and process speech recognition data to carry out ASR. Further, the processor 116 controls, generates, and accepts signals transmitted between the telematics unit 114 and call center 108 via the communications systems 104, 106, and between the telematics unit 114 and the vehicle communication bus 112 that is connected to the various mechanical and/or electronic VSM's 110. In one mode, these signals are used to activate programming and operation modes of the VSM's 110.

Telematics Memory

The telematics memory 122 can be any electronic storage device that provides computer-readable storage of data and programs for use by the processor 116. The memory 122 can include volatile, and/or non-volatile memory storage, such as RAM, NVRAM, hard disks, flash memory, etc., and can be implemented as one or more separate physical devices. The programs 124 include one or more computer programs that are executed by the processor 116 to carry out the various functions of the telematics unit 114. For example, the software or programs 124 resident in the memory 122 and executed by the processor 116 are used for monitoring, recognizing, and/or recording utterances or speech from a vehicle occupant via the user interface 128. The database 126 is used to store voice message data, diagnostic trouble code data, or other diagnostic data. For example, the database 126 includes speech recognition databases such as acoustic models, vocabularies, grammars, and the like. This database 126 can be implemented as database tables that enable lookups to be performed on data stored in the database 126, and this can be done using known indexing techniques and/or database queries, or by straight serial searching through such tables. These and other database storage and lookup techniques are well known to those skilled in the art.

Telematics Communications Device

The telematics communications device 118 provides wireless communication via cellular satellite, or other wireless path, and facilitates both voice and data communications. For example, the wireless communications device 118 and associated antenna 120 transmits and receives voice and data to and from the wireless communication system 104 so that the telematics unit 114 can communicate with the call center 108 via the second communication system 106. Accordingly, the wireless communications device 118 is preferably equipped with cellular communications software and hardware such as a wireless modem or embedded cellular telephone, which can be analog, digital, dual mode, dual band, multi mode, and/or multi-band, and can include a separate processor and memory. Also, the wireless communications device 118 preferably uses cellular technology such as CDMA or GSM, but could also utilize proprietary or other wireless technologies to communicate with the wireless communication system 104. The wireless communications device 118 can include additional or integrated functionality such as satellite communications software and hardware including a global positioning system (GPS) receiver. Such a GPS receiver receives location and time data from the wireless communication system 104 and conveys corresponding latitude and longitude information to the telematics unit 114 to enable the telematics unit 114 to process, store, and send location information to carry out services such as navigation, driving directions, and emergency services.

Telematics User Interface

The telematics user interface 128 includes one or more input and output modules and/or devices to receive input from, and transmit output to, a vehicle occupant. As used herein, the term interface broadly means any suitable form of electronic device or adapter, or even a software module or adapter, which enables a user or a piece of equipment to communicate with or control another piece of equipment. The interface described herein can be a single interface or can be implemented as separate interfaces or any combination thereof.

The input devices include one or more of the following devices: one or more tactile devices 130 such as one or more pushbutton switches, keypads, or keyboards; one or more microphones 132; or any other type of input device. The tactile input device 130 enables user-activation of one or more functions of the telematics unit 114 and can include a pushbutton switch, keypad, keyboard, or other suitable input device located within the vehicle in reach of the vehicle occupants. For example, the tactile input device 130 can be used to initiate telecommunications with remote locations, such as the call center 108 or cellular telephones and/or to initiate vehicle updates, diagnostics, or the like. The microphone 132 allows a vehicle occupant to provide voice commands or other verbal input into the telematics unit 114, as well as voice communication with various remote locations via the communications device 122. Voice commands from the vehicle occupant can be interpreted using a suitable analog-to-digital interface or digital signal processor such as a sound card (not shown) between the microphone 132 and the processor 116 and voice recognition programs and data stored within the memory 122.

The output devices can include one or more speakers 134, a visual display device such as a liquid crystal or plasma screen (not shown), or any other types of output devices. The speaker(s) 134 enable the telematics unit 114 to communicate with the vehicle occupant through audible speech, signals, or audio files, and can be stand-alone speakers specifically dedicated for use with the telematics unit 114, or they can be part of the vehicle audio system. A suitable interface device such as a sound card (not shown) can be interposed between the speakers 134 and the telematics processor 116.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSM's 110 are shown separate from the telematics unit 114, it is possible for any combination of these VSM's 110 to be integrated within the telematics unit 114. Furthermore, the telematics unit 114 could include additional components not shown here, or could omit some of the components shown here.

Communication System(s)

The wireless communication system 104 can include an analog or digital cellular network 136, a wireless computer network such as a wide area network (not shown), or any other suitable wireless network used to transmit voice and data signals between the vehicle 102 and various remote locations such as the call center 108 and/or service center 111. In one embodiment, the cellular network 136 is implemented as a CDMA, GSM, or other cellular communication network that exchanges voice and data between the vehicle 102 and the second communication system 106. Additionally or alternatively, wireless communication can be carried out by satellite transmission using one or more satellites 138 to connect the vehicle 102 to the second communication system 106 via a central, ground-based satellite transceiver 140.

The second communication system 106 can be another wireless communication system or can be a land-based wired system such as a public switched telephone network (PSTN), an Internet Protocol (IP) network, an optical network, fiber network, or other cable network, and/or any combination of the aforementioned examples, any of which can be used for voice and/or data communication. Those skilled in the art will recognize that the communication systems 104, 106 can be implemented separately or can be combined as an integral system.

Call Center

The call center 108 includes one or more locations and can be automated and/or staffed by advisors 142 to handle calls from vehicle occupants and/or to monitor various vehicle conditions such as an airbag deployment. The call center 108 includes one or more voice and/or data interfaces 144 such as modems, switches, and/or routers, to transmit and receive voice and/or data signals between the vehicle telematics unit 114 and the call center 108 through the communications systems 104, 106. The call center 108 also includes one or more communication service managers 146, one or more servers 148 to process data, one or more suitable databases 150 to store subscriber data and any other suitable data, and one or more networks 152 such as a LAN for connecting the call center components together along with the any computer (s) used by the one or more advisors 142. For example, the servers 148 and databases 150 execute and store one or more speech recognition programs and speech recognition data to carry out ASR, either alone or in conjunction with the telematics unit 114 of the vehicle 102. Suitable call center facilities are known and currently in use to provide remote assistance by human advisors in connection with in-vehicle safety and security systems. Apart from using human advisors, the advisors 142 can be implemented as automatons or programs running on a computer operatively disposed to respond to subscriber requests.

Web Server

The integration of the web server 109 with the system 100 enables a vehicle occupant to access websites and other content over the Internet, all from the vehicle using automated speech recognition technology and text-to-voice technology such as VoiceXML, or the like. For example, a vehicle occupant can use the telematics unit 114 and embedded speech recognition to ask for information, such as by vocalizing a command like "weather" or by speaking a nametag associated with a particular website address. The speech recognition technology recognizes the command or nametag and translates the request into suitable web language such as XML (Extensible Markup Language) and/or associate the request with a stored user profile, which correlates the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupant via the user interface 128.

The web server 109 is implemented using one or more computer servers located either at an independent remote location or, for example, at the call center 108. If desired, the web server 109 can be integrated into the call center 108 rather than utilizing two separate systems. The exemplary server 109 includes a suitable communication interface 154 such as a modem, switch, and/or router, a computer 156, and a database 158 all connected by a suitable network 160 such as an Ethernet LAN. The database 158 can be implemented using a separate network attached storage (NAS) device or can be stored on the computer 156 itself, or can be located elsewhere, as desired. The computer 156 has a server application program that controls the exchange of data between the vehicle 102 and the database 158 via the communication systems 104, 106. The web server 109 also communicates with the call center 108 and/or the service center 111 either via the second communication system 106 or by some more direct path. Suitable server hardware and software configurations are known to those skilled in the art.

Service Center

The service center 111 can be a vehicle service center such as a dealership where vehicle maintenance and repair is carried out. The service center 111 is connected by the communication systems 104, 106 with the vehicle 102 so that a vehicle occupant can initiate a telephone call with a technician or service scheduler at the service center 111.

Exemplary ASR System

In general, a human user vocally interacts with an automatic speech recognition system for one or more fundamental purposes: to train the system to understand the user's voice; to store discrete speech such as a spoken nametag or a spoken control word like a numeral or keyword; or to use the recognition system to have the user's speech recognized and used for some useful end purpose such as voice dialing, menu navigation, transcription, or the like. In general, ASR extracts acoustic data from human speech, compares/contrasts the acoustic data to stored subword data, selects an appropriate subword which can be concatenated with other selected subwords, and outputs the corresponding subwords or words for post-processing such as dictation or transcription, address book dialing, storing to memory, training ASR models or adaptation parameters, or the like.

ASR systems are generally known to those skilled in the art, and FIG. 2 illustrates an exemplary specific architecture for an ASR system 210 to provide exemplary context for the method described herein below. The system 210 includes a device to receive speech such as the telematics microphone 132 and an acoustic interface 133 such as the telematics soundcard to digitize the speech into acoustic data. The architecture 210 also includes a memory such as the telematics memory 122 for storing the acoustic data and storing speech recognition software and databases, and a processor such as the telematics processor 116 to process the acoustic data. The processor 116 uses the speech recognition databases, a front-end processor or pre-processor software module 212 for parsing streams of the acoustic data of the speech into parametric representations such as acoustic features, a decoder software module 214 for decoding the acoustic features to yield digital subword or word output data corresponding to the input speech utterances, and a post-processor software module 216 for using the output data from the decoder module 214 for any suitable purpose.

One or more modules or models are used as input to the decoder module 214. First, grammar or lexicon model(s) 218 provide rules governing which words can logically follow other words to form valid sentences. In a broad sense, a grammar also defines a universe of vocabulary the system expects at any given time in any given ASR mode. For example, if the system 210 is in a training mode for training commands, then the grammar model(s) 218 can include all commands known to and used by the system 210. Second, acoustic model(s) 220 assist with selection of most likely subwords or words corresponding to input from the pre-processor module 212. Third, word model(s) 222 and sentence/language model(s) 224 provide syntax and/or semantics in placing the selected subwords or words into word or sentence context. Also, the sentence/language model(s) can define a universe of sentences the system expects at any given time in any given ASR mode and/or can provide rules governing which sentences can logically follow other sentences to form valid extended speech.

According to an alternative exemplary embodiment, some or all of the ASR system 210 can be resident on, and processed using, computing equipment in a location remote from the vehicle 102, such as the call center 108, web server 109, or the like. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software such as HMM decoders can be processed using processors of one of the servers 148 in the call center 108. In other words, the ASR system 210 can be distributed across the call center 108 and the vehicle 102 in any desired manner. Likewise, the methods described herein can be carried out entirely by the telematics unit 114 of the vehicle 102, by the computing equipment in the call center 108, or by any combination thereof.

Extracting Acoustic Data

First, acoustic data is extracted from human speech wherein a user speaks into the microphone 132, which converts the utterances into electrical signals and communicates such signals to the acoustic interface 133. A sound-responsive element in the microphone 132 captures the user's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into streams of digital data. In other words, the acoustic interface 133 converts the analog signals into digital electronic signals. The digital data are binary bits which are buffered in the telematics memory 122 and then processed by the telematics processor 116 or can be processed as they are initially received by the processor 116 in real-time.

Pre-Processing

Second, the pre-processor module 212 transforms the continuous stream of digitized speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The preprocessor module 212 also performs phonetic analysis to extract acoustic parameters from the user's speech, such as time-varying feature vectors, from within each frame. Utterances within the user's speech can be represented as sequences of these feature vectors. For example, and as known to those skilled in the art, feature vectors can be extracted and can include, for example, vocal pitch, energy profiles, and/or spectral attributes, or cepstral coefficients that are obtained by performing Fourier transforms of the frames and decorrelating acoustic spectra using cosine transforms. Thus, an unknown test pattern of speech is a concatenation of related acoustic frames and corresponding parameters covering a particular duration of speech.

Decoding

Third, the processor executes the decoder module 214 to process the incoming feature vectors of each test pattern. The decoder module 214 is also known as a recognition engine or classifier and uses stored known reference patterns of speech. Like the test patterns, the reference patterns are defined as a concatenation of related acoustic frames and corresponding parameters. The decoder module 214 compares and contrasts the acoustic feature vectors of a subword to be recognized with stored subword models or patterns, assesses the magnitude of the differences or similarities therebetween, and ultimately uses decision logic to choose a best matching subword from the models as the recognized subword. The best matching subword is typically that which corresponds to the stored known reference pattern that has the minimum dissimilarity to, or highest probability of being, the test pattern.

Recognized subwords can be used to construct words with help from the word models 222 and to construct sentences with the help from the language models 224. The decoder module 214 can use various techniques known to those skilled in the art to analyze and recognize subwords, including but not limited to dynamic time-warping classifiers, artificial intelligence techniques, neural networks, free phoneme recognizers, and probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword, such as by the application of Bayes' Theorem. A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMM's for a sequence of subwords can be concatenated to establish word HMM's.

The speech recognition decoder 214 processes the feature vectors using the appropriate acoustic models, grammars, and algorithms to generate an N-best list of nametag templates. As used herein, the term templates is interchangeable with models, waveforms, reference patterns, rich signal models, exemplars, hypotheses, or other types of references. A template can include a series of feature vectors representative of a word or subword and can be based on particular speakers, speaking styles, and audible environmental conditions. Those skilled in the art will recognize that templates can be generated by suitable template training of the ASR system and stored in memory. Those skilled in the art will also recognize that stored templates can be manipulated, wherein parameter values of the templates are adapted based on differences in speech input signals between template training and actual use of the ASR system. For example, a set of templates trained for one ASR user or certain acoustic conditions can be adapted and saved as another set of templates for a new ASR user or new acoustic conditions, based on a limited amount of training data from the new user or the new acoustic conditions. In other words, the templates are not necessarily fixed and can be processed during speech recognition.

Using the in-vocabulary grammar and any suitable decoder algorithm(s) and acoustic model(s), the processor accesses from memory several templates interpretive of the spoken command. For example, the processor can generate, and store to memory, a list of N-best vocabulary results or templates, along with corresponding parameter values. Exemplary parameter values can include confidence scores of each template in the N-best list of vocabulary and associated segment durations, likelihood scores, signal-to-noise (SNR) values, and/or the like. The N-best list of vocabulary can be ordered by descending magnitude of the parameter value(s). For example, the vocabulary template with the highest confidence score is the first best template, and so on.

Post-Processing

The post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212, or the like.

Methods of Applying Speech Recognition Adaptation

A method of applying speech recognition adaptation is provided herein and can be carried out using the architecture of the ASR system 210 within the operating environment of the telematics system 100 described above. Those skilled in the art will also recognize that the method can be carried out using other ASR systems within other operating environments.

Figure 3:
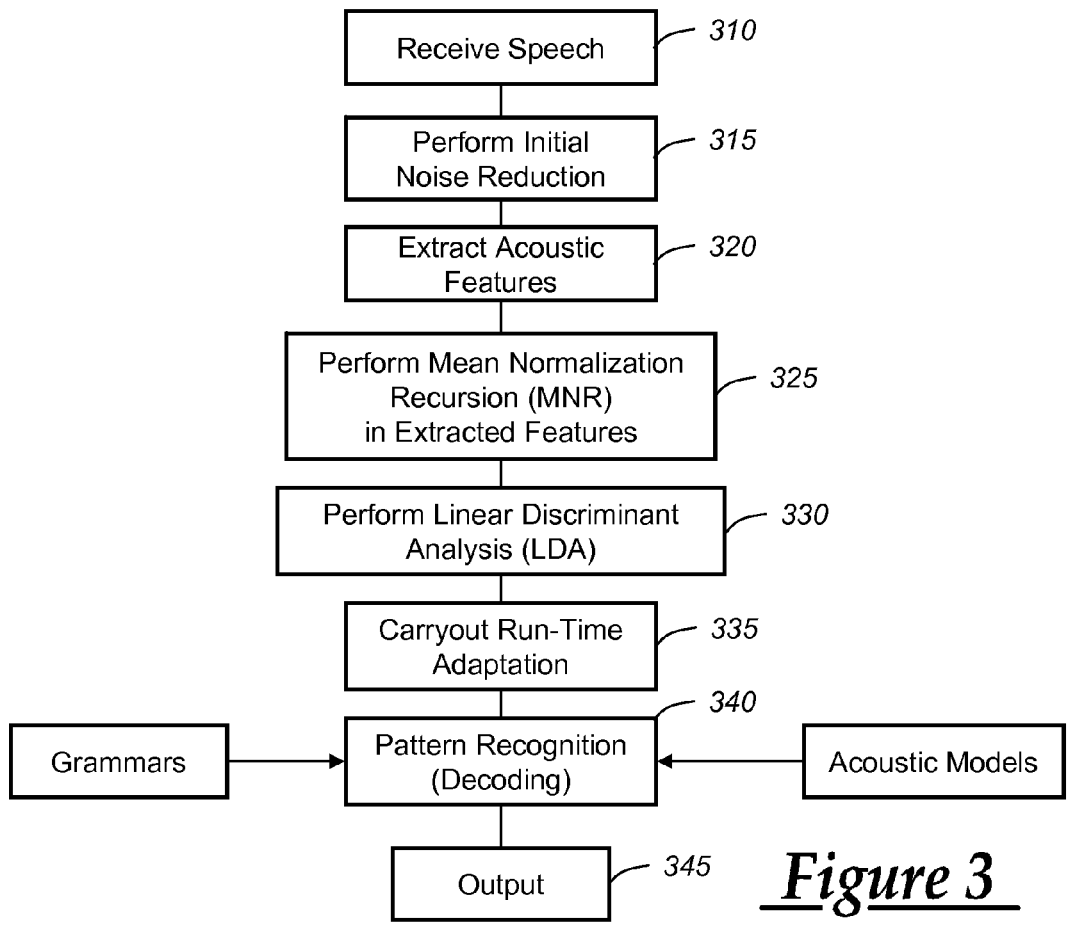
FIG. 3 is a flow chart of an embodiment of an exemplary speech recognition method, which can be carried out using the telematics system and ASR architecture of FIGS. 1 and 2.

In general, FIG. 3 illustrates an exemplary method of acoustic feature extraction and decoding 300. At step 310, the ASR-enabled telematics unit 114 receives an utterance from a user, such as through the user interface microphone 132 to the pre-processor 212. For example, a vehicle user can start interaction with the user interface of the telematics unit 114, preferably by depressing the user interface pushbutton 130 to begin a session in which the user inputs voice commands that are interpreted by the telematics unit 114 while operating in a speech recognition mode.

At step 315, initial noise reduction is performed on the incoming acoustic signal. For example, an acoustic filter bank can be applied to the signal in its spectral domain, or any other suitable initial noise reduction technique can be applied. Spectral domain noise reduction techniques are generally known to those skilled in the art and will not be discussed in further detail herein.

At step 320, acoustic features are extracted from the incoming acoustic signal. For example, Mel-frequency cepstral coefficients (MFCC's) are acoustic features that can be extracted, although any other suitable features can also or instead be extracted. MFCC extraction is known to those skilled in the art and will not be discussed in detail.

At step 325, convoluted noise is removed from the extracted acoustic features. Any suitable convoluted noise removal technique can be employed but, for example, mean normalization recursion (MNR) are preferably performed on the extracted acoustic features. Using MNR, a plurality of frames of acoustic features are observed, and a mean value of each feature within the frames is calculated. All other feature values are thereafter omitted and the mean values are retained for further processing. MNR is known to those skilled in the art and will not be discussed in further detail.

At step 330, the normalized acoustic features are then weighted or discriminatively trained so that certain portions of the acoustic input are emphasized for improved recognition. Any suitable weighting technique can be employed but, for example, linear discriminant analysis (LDA) can be performed on the acoustic features. LDA is used to reduce a plurality of acoustic frames each having a plurality of acoustic features to an acoustic feature vector. For example, a nine frame by thirteen feature matrix can be transformed using LDA to an acoustic feature vector having 39 features. LDA is known to those skilled in the art and will not be discussed in further detail.

At step 335, the acoustic feature vectors are processed using any suitable automatic speech recognition adaptation technique to adapt the ASR system for better performance despite different users, user gender, user dialects, and/or acoustic environmental conditions. ASR adaptation routines are initialized, independently of speaker and/or environmental characteristics, with default adaptation parameters like identity matrices. Some ASR adaptation techniques are known as "speaker adaptation" or "speaker transformation" or "speaker conversion". In one example, an existing set of acoustic feature vectors associated with a particular speaker or user can be mathematically transformed with an acoustic adaptation parameter to yield adapted acoustic feature vectors for the user. Feature vectors are transformed with one or more adaptation parameters so that the likelihood of observing or recognizing input speech for a given speech class or utterance is maximized.

For example, under run time adaptation, pre-processed acoustic feature vectors are transformed with adaptation parameters to better match acoustic models during decoding. In general, adaptation according to the current method 300 includes three main steps. First, adaptation parameters are applied before decoding, wherein feature vectors of a speech segment are mathematically transformed with a given matrix of transformation or adaptation parameters to improve the likelihood of correctly decoding the feature vectors. Second, during post-processing, acoustic features corresponding to a selected hypothesis of the recognized speech are used in conjunction with any suitable parameter training method such as maximum likelihood estimation, discriminative training, or the like, to adjust the matrix of transformation or adaptation parameters. Third, the adjusted matrix of adaptation parameters is fed back as a trained adaptation parameter for use during the first step in a subsequent process on an ensuing segment of speech.

One exemplary type of run time adaptation that can be used is known as feature space maximum likelihood linear regression (FMLLR). Those skilled in the art recognized that FMLLR adaptation is carried out using a feature space transform according to $\hat{Y}=AY+b$, wherein Y represents speech frames, A represents the transformation, and b represents adaptation bias. The transform and bias are computed iteratively such that likelihood values of the transformed adaptation data are maximized. Any suitable ASR adaptation technique can be used including model adaptation, run time adaptation, or the like. Particular ASR adaptation techniques and parameter training routines are known to those skilled in the art and, aside from the application methods discussed herein, will not be discussed further.

At step 340, any suitable decoding of the processed feature vectors can be carried out, using suitable grammars 218, acoustic models 220, and the like.

Finally, at step 345, the process concludes with suitable output from the decoding step 340.

Figure 4B:
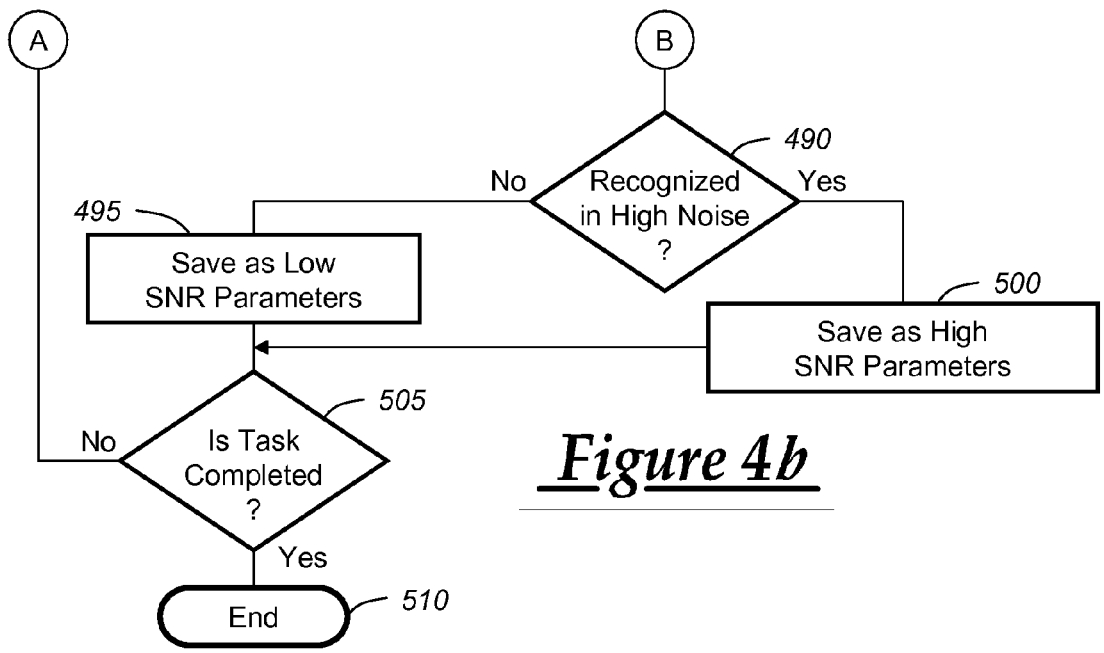
FIG. 4 is a flow chart of an embodiment of an exemplary method of applying speech recognition adaptation, which can be carried out in conjunction with the method of FIG. 3 and using the telematics system and ASR architecture of FIGS. 1 and 2.
Figure 4A:
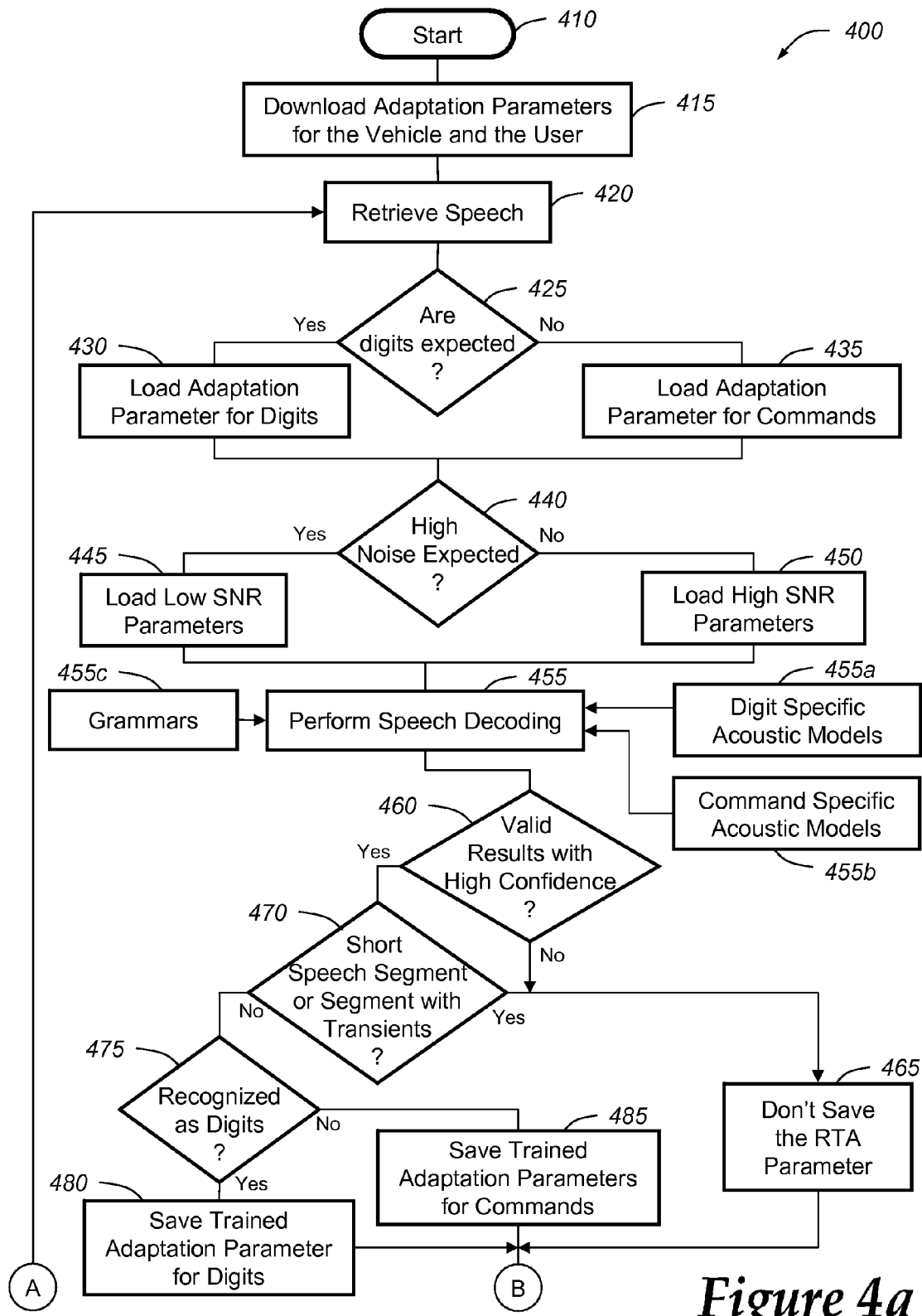

FIG. 4 illustrates an exemplary method of applying ASR adaptation 400. As will be discussed in further detail below, the method involves one or more of the following enhancements to application of ASR adaptation within a telematics equipped vehicle: employing vehicle and user specific initial adaptation parameters; using acoustic model specific adaptation parameters; using task specific adaptation parameters; using noise specific adaptation parameters; using grammar specific adaptation parameters; skipping adaptation learning for short speech segments or speech segments with transients; ensuring persistence of adaptation parameters; providing user specific adaptation parameters; and resetting adaptation parameters.

At step 410, the method is initialized, such as toward the end of a speech pre-processing routine and/or near the beginning of a speech decoding routine.

At step 415, pre-trained default adaptation parameters are downloaded to the vehicle from the call center. The adaptation parameters can be downloaded at any suitable time, such as upon a first ignition event of the vehicle after the vehicle is purchased, or during a reset to use of default adaptation parameters from the use of trained adaptation parameters. The default adaptation parameters are preferably not downloaded every time the method 400 is carried out. In other words, step 415 can be skipped.

According to conventional adaptation processes, only one adaptation parameter is used. Moreover, with conventional ASR adaptation techniques, adaptation parameters are initialized with an identity matrix and several utterances from the user are required to suitably train the adaptation parameters to a particular vehicle environment and/or a particular speaker. According to the present method 400, however, multiple adaptation parameters can be used, and speech segments are observed for one or more certain characteristics and then adaptation parameters associated with the characteristics are trained and saved for later recall and use as one or more trained adaptation parameters in transforming feature vectors of subsequent speech having the same characteristics.

For example, one adaptation parameter based on vehicle-specific characteristics can be applied and another adaptation parameter based on user specific characteristics can also be applied. More specifically, a unique adaptation parameter can be pre-trained or developed for each type of vehicle, such as a car or truck, and every type of anticipated noise condition particular to that type of vehicle. Also, unique adaptation parameters can be pre-trained for a particular user identity, user gender, or user dialect based on a region where the vehicle was purchased or is registered. The pre-trained adaptation parameters can be stored in a server in the call center and, once the vehicle is purchased and activated a first time, up-to-date pre-trained default adaptation parameters can be downloaded to the vehicle and transformed with acoustic feature vectors to yield transformed acoustic feature vectors for improved decoding. Examples of development and use of user or vehicle specific parameters are disclosed in U.S. patent application Ser. No. 11/235,961 filed Sep. 27, 2005, which is incorporated by reference herein in its entirety.

At step 420, speech input is retrieved in any suitable manner such as in accordance with the exemplary ASR system 210 and/or speech extraction 300 described above.

Over steps 425 through 450, adaptation is implemented specific to certain characteristics of the speech being observed and analyzed. In conventional adaptation processes, only one adaptation parameter is used for all types of speech and this can lead to a lack of convergence in adaptation processes. For example, if the adaptation parameter is used or trained over a long period of time with discrete commands like "Call", "Exit", etc., then the ASR system may have difficulty in recognizing other speech types, such as continuous digits. This is because the parameters have been overtrained for so long towards the discrete commands.

Therefore, referring to steps 425-435 of the present method 400, separate adaptation parameters are provided to correspond to different types of speech being observed and analyzed, such as speech corresponding to discrete digits, continuous digits, natural numbers, navigation, commands, nametags, destination entries, or the like. For example, in step 425 it can be determined or observed what type of speech class is expected, such as digit speech like a vocalized "Zero" or "Nine" or the like. If digit speech is expected, then adaptation parameters specifically associated with digit speech can be recalled from memory and used to transform acoustic feature vectors of the speech as shown at step 430. If, however, some other type of speech class is expected, such as command speech (like a vocalized "Call" or "Exit"), then adaptation parameters specifically associated with command speech can be recalled from memory and used to transform acoustic feature vectors of the speech as shown at step 435.

Similarly, over steps 440 through 450, adaptation is carried out specific to the type of environmental noise present in the speech being observed and analyzed, such as high noise or low noise backgrounds. For example, if adaptation parameters are overtrained for high noise conditions and there is a sudden change in ambient noise to a low noise condition, then the adaptation process may not converge and recognition will be compromised. Accordingly, in step 440 it can be determined what type of noise level is expected. If, for example, a high noise environment is expected such as during highway driving, then a low signal-to-noise-ratio (SNR) adaptation parameter can be loaded and used to transform acoustic feature vectors of the speech as shown at step 445. If, however, a low noise environment is expected such as during vehicle idle, then a high SNR adaptation parameter can be loaded and used to transform acoustic feature vectors of the speech as shown at step 450. Accordingly, the ASR adaptation process requires less time to converge in optimizing the adaptation parameters.

At step 455, speech decoding can be carried out in any suitable manner such as in accordance with the exemplary ASR system 210 described above. The speech recognition decoder 214 receives and processes the transformed acoustic feature vectors, preferably using acoustic models and grammars as described below.

In accordance with a presently preferred aspect of the decoding step 455, adaptation is carried out in a manner specific to the type of acoustic model being used for decoding. If the decoder relies on multiple acoustic models to carry out decoding, then it is appropriate to select and use adaptation parameters which have been optimized for a given acoustic model so that the feature vectors are more optimally transformed. In other words, an acoustic model can be developed for a particular type of speech class like digit speech, and then used for training adaptation parameters that correspond to digit speech, as exemplified by block 455a. In another example, an acoustic model can be developed for another type of speech class like command speech, and then used for training adaptation parameters that correspond to command speech, as exemplified by block 455b. In a further example involving a bilingual decoder, incoming feature vectors are transformed using a first adaptation parameter optimized for a first language acoustic model, and using a second adaptation parameter optimized for a second language acoustic model.

In accordance with another presently preferred aspect of the decoding step 455, adaptation is carried out in a manner specific to the type of grammar being referenced for decoding. In other words, a particular type of grammar, like main-menu grammar, can be used for training adaptation parameters that correspond to expected words from the main-menu grammar, as exemplified by block 455c. In other examples, other types of grammars, such as discrete or continuous digit grammars, navigation grammars, nametag training or recalling grammars, or the like, can be used for training adaptation parameters that correspond to expected words from those particular grammars.

At step 460, it is determined whether the decoding step yielded valid results with high confidence scores. For example, from the decoding step, the confidence score of the identified best hypothesis or first best template can be compared to a predetermined minimum confidence score. If the confidence score is not greater than the minimum confidence score, then the adaptation parameters are not trained or saved to memory for later use, as shown in step 465. Otherwise, the method proceeds to step 470, and the adaptation parameters can be stored to memory for subsequent training and saving as trained adaptation parameters in transforming feature vectors of subsequent segments of speech.

At step 470, a determination is made whether to train and then save the adaptation parameter associated with the speech segment, if an observed reliability characteristic of the presently observed speech segment exceeds a predetermined minimum value. Exemplary reliability characteristics include, but are not limited to, a minimum length of speech segment or a minimum SNR value. In other words, if a speech segment is too short or has excessive transient noises associated with it, then the trained adaptation parameters are not saved.

In a specific example, the length of the present speech segment in frames can be compared to some predetermined minimum number of frames. If the length is less than the minimum, then the adaptation parameters are not trained or saved to memory for later use, as shown in step 465. More specifically, relatively short speech segments such as segments corresponding to vocalized "Yes" or "No", can be ignored for purposes of training adaptation parameters. If, however, the length exceeds the minimum, then the adaptation parameters can be trained and stored for subsequent recall and use as trained adaptation parameters in transforming feature vectors of subsequent segments of speech.

In another specific example, if unacceptable levels or quantities of transient noises are found to be present within the speech segment, regardless of its length, then the adaptation parameters are not trained or saved to memory for later use, as shown in step 465. Such transients can yield unacceptably low SNR values, and can be associated with environmental or background events such as turn signal beeping, hazard light clicking, windshield wiper switching, door slams, horn honks, and the like. If adaptation occurs in the presence of such transients, then the adaptation parameters tend to diverge over time, thereby degrading the performance of the recognizer.

At step 475, it is determined what type of speech class was recognized, such as digit speech. If digit speech was recognized, then adaptation parameters specifically associated with digit speech can be trained and saved to memory as shown at step 480, for later recall and use on another speech segment as shown at step 430. If however, some other type of speech class is expected, such as command speech, then adaptation parameters specifically associated with command speech can be trained and saved to memory as shown at step 485, for later recall and use on another speech segment as shown at step 435.

Similarly, over steps 490 through 500, adaptation parameters are saved to memory according to the type of environmental noise present in the speech recognized, such as high noise or low noise backgrounds. In step 490, it can be determined what type of noise level was present in the speech segment just recognized. If, for example, a high noise environment was present such as a highway driving background, then the adaptation parameter can be trained and saved as shown at step 495 as a low signal-to-noise-ratio (SNR) adaptation parameter, such that the related adaptation parameters are available for later recall and use on another speech segment as shown at step 445. If, however, a low noise environment was present such as a vehicle idle background, then the related adaptation parameters can be trained and saved as shown at step 500 as a high SNR adaptation parameter, such that the adaptation parameters are available for later recall and use on another speech segment as shown at step 450.

Finally, the method proceeds to step 505 wherein it is determined whether the present speech recognition task of a word or string of words is completed. If not, then the method loops back to step 420 to retrieve a subsequent segment of speech to be processed. If so, then the method ends at step 510.

It is desirable to store the adaptation parameters for later use. With conventional adaptation techniques, trained adaptation parameters are not saved and then loaded upon each vehicle ignition event. Instead, conventionally, adaptation parameters are initialized to their default identity matrix values for every vehicle ignition event. But according to the present methods 300, 400, adaptation parameters are trained and saved in memory, such as in steps 480-485 and 495-500, and recalled from memory for use in subsequent speech recognition tasks. In other words, ASR adaptation is carried out with persistence of trained adaptation parameters such that the trained adaptation parameters persist from one vehicle ignition cycle to the next. Accordingly, adaptation parameters need not be completely relearned upon every ignition cycle.

Also, it is preferable to observe speech for user identity, and store and recall trained adaptation parameters according to the specific user identity whose speech is being observed and analyzed. In other words, when the ASR system is performing speech recognition for a particular user, a group of trained adaptation parameters are stored for that particular user for later recall when that user is again using the ASR system. Similarly, when a different user is using the ASR system, a separate group of trained parameters are stored and recalled for that different user. Stated another way, the adaptation parameters are individualized for each user.

It is also desirable to abandon use of the current trained adaptation parameters upon detection of some system fault. Sometimes adaptation parameters can become overtrained to one specific type of environment, type of speech, grammar, user, or the like, and it may become difficult to retrain the adaptation parameters for a different environment, type of speech, grammar, user, etc. Therefore, according to the method 400, adaptation parameters can be reset to initial default values from the call center, for example, if a customer service representative recognizes a system fault and deems it necessary to do so. In another example, the adaptation parameters can be automatically reset. For instance, the parameters can be reset based on when the ASR system detects a fault in the form of divergence of the adaptation process, such as through a recognized ill condition of the transformation matrix. Alternatively, the parameters can be reset when the ASR system detects a fault in the form of a predetermined number of speech recognition failures. In a further example, use of the trained adaptation parameters can be halted altogether, such that the adaptation process is stopped.

Accordingly, the methods 300, 400, can provide one or more of the following potential advantages. The adaptation processes can converge sooner because initial adaptation parameters loaded to the vehicle are pre-trained with useful vehicle-specific or user-specific data instead of being mere identity matrices. Providing persistence of the adaptation parameters instead of reset upon each ignition event enables faster adaptation to unique characteristics of the vehicle environment and the particular user. Providing noise-specific adaptation parameters minimizes problems of overtraining of an adaptation parameter to one type of noise condition. Adaptation parameters can be stored and recalled as a function of the particular user, thereby enabling more accurate recognition for each user and/or faster convergence of the adaptation process. Adaptation parameters can also be stored and recalled as a function of speech type or acoustic model type, thereby enabling more accurate recognition for each type of speech or acoustic model and/or faster convergence of the adaptation process. Overall, the methods 300, 400 improve recognition accuracy and/or speed, thereby increasing customer satisfaction.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of speech recognition adaptation for a vehicle having a telematics unit with an embedded speech recognition system, the method comprising the steps of:
   (a) receiving speech;
   (b) pre-processing the speech to generate acoustic feature vectors;
   (c) applying at least one adaptation parameter to the acoustic feature vectors to yield transformed acoustic feature vectors;
   (d) decoding the transformed acoustic feature vectors to select a hypothesis therefrom corresponding to the received speech;
   (e) training the at least one adaptation parameter with acoustic feature vectors of the selected hypothesis to yield at least one trained adaptation parameter; and
   (f) ceasing use of the at least one adaptation parameter upon detection of a system fault, wherein the ceasing step (f) comprises:
      (1) determining if the at least one trained adaptation parameter has become overtrained; and
      (2) resetting the at least one trained adaptation parameter to default values if the at least one trained adaptation parameter has become overtrained.

2. The speech recognition method of claim 1, wherein the determining step includes at least one of detecting divergence of the adaptation process or a predetermined number of speech recognition failures.

3. A method of speech recognition adaptation for a vehicle having a telematics unit with an embedded speech recognition system, the method comprising the steps of:
   (a) receiving speech;
   (b) pre-processing the speech to generate acoustic feature vectors;
   (c) applying at least one adaptation parameter to the acoustic feature vectors to yield transformed acoustic feature vectors;
   (d) decoding the transformed acoustic feature vectors to select a hypothesis therefrom corresponding to the received speech;
   (e) training the at least one adaptation parameter with acoustic feature vectors of the selected hypothesis to yield at least one trained adaptation parameter;
   (f) pre-training at least one default adaptation parameter based on at least one of vehicle-specific characteristic; and
   (g) downloading the at least one pre-trained default adaptation parameter to the vehicle.

4. The speech recognition method of claim 3, wherein the at least one vehicle-specific characteristic includes at least one of vehicle type or noise conditions particular to vehicle type.

5. The method of claim 3 wherein step (f) includes pre-training multiple default adaptation parameters based on the at least one vehicle-specific characteristic and based on at least one user-specific characteristic and step (g) includes downloading the multiple pre-trained default adaptation parameters to the vehicle.

6. The speech recognition method of claim 5, wherein the user-specific characteristics include at least one of user gender, or user dialect based on a region where the vehicle was purchased or is registered.

7. A method of speech recognition adaptation for a vehicle having a telematics unit with an embedded speech recognition system, the method comprising the steps of:
   (a) receiving speech;
   (b) pre-processing the speech to generate acoustic feature vectors;
   (c) applying at least one adaptation parameter to the acoustic feature vectors to yield transformed acoustic feature vectors;
   (d) decoding the transformed acoustic feature vectors to select a hypothesis therefrom corresponding to the received speech;
   (e) training the at least one adaptation parameter with acoustic feature vectors of the selected hypothesis to yield at least one trained adaptation parameter; and
   (f) observing the speech for a speech type characteristic and saving the at least one trained adaptation parameter in accordance with the speech type characteristic for use in transforming feature vectors of subsequent speech having the speech type characteristic.

8. The speech recognition method of claim 7 wherein step (f) comprises observing the speech for at least one of digit speech or command speech, saving the at least one adaptation parameter associated with the speech as a trained digit speech adaptation parameter when the speech is determined to be digit speech, and saving the at least one adaptation parameter associated with the speech as a trained command speech adaptation parameter when the speech is determined to be command speech.

9. The speech recognition method of claim 7 wherein step (f) comprises observing the speech for at least one of low noise speech or high noise speech, saving the at least one adaptation parameter associated with the speech as a trained low noise speech adaptation parameter when the speech is determined to contain low noise levels, and saving the at least one adaptation parameter associated with the speech as a trained high noise speech adaptation parameter when the speech is determined to contain high noise levels.

10. A method of speech recognition adaptation for a vehicle having a telematics unit with an embedded speech recognition system, the method comprising the steps of:
    (a) receiving speech;
    (b) pre-processing the speech to generate acoustic feature vectors;
    (c) applying at least one adaptation parameter to the acoustic feature vectors to yield transformed acoustic feature vectors;
    (d) decoding the transformed acoustic feature vectors to select a hypothesis therefrom corresponding to the received speech;
    (e) training the at least one adaptation parameter with acoustic feature vectors of the selected hypothesis to yield at least one trained adaptation parameter;
    (f) observing the speech for a certain characteristic and saving the at least one trained adaptation parameter in accordance with the certain characteristic for use in transforming feature vectors of subsequent speech having the certain characteristic; and
    (g) using at least one of an acoustic model or a grammar developed specific to the certain characteristic.

11. The speech recognition method of claim 10, wherein step (g) comprises at least one of observing digit speech in the speech and using an acoustic model developed specific to digit speech, observing command speech in the speech and using an acoustic model developed specific to command speech, or observing a particular language of the speech and using an acoustic model developed specific to that particular language.

12. The speech recognition method of claim 10, wherein step (g) comprises observing nametag training grammar in the speech and using a grammar developed specific to nametag training.

13. A method of speech recognition adaptation for a vehicle having a telematics unit with an embedded speech recognition system, the method comprising the steps of:
   (a) receiving speech;
   (b) pre-processing the speech to generate acoustic feature vectors;
   (c) applying at least one adaptation parameter to the acoustic feature vectors to yield transformed acoustic feature vectors;
   (d) decoding the transformed acoustic feature vectors to select a hypothesis therefrom corresponding to the received speech;
   (e) training the at least one adaptation parameter with acoustic feature vectors of the selected hypothesis to yield at least one trained adaptation parameter;
   (f) observing the speech for a certain characteristic and saving the at least one trained adaptation parameter in accordance with the certain characteristic for use in transforming feature vectors of subsequent speech having the certain characteristic, wherein the certain characteristic is a speech recognition reliability characteristic including at least one of speech length or SNR level and the method further comprises the steps of:
   (g) determining whether the speech recognition reliability characteristic exceeds a minimum value; and
   (h) storing the at least one trained adaptation parameter, if the speech recognition reliability characteristic exceeds the minimum value and, if not, then not storing the at least one trained adaptation parameter.

14. A method of speech recognition adaptation for a vehicle having a telematics unit with an embedded speech recognition system, the method comprising the steps of:
   (a) receiving speech;
   (b) pre-processing the speech to generate acoustic feature vectors;
   (c) applying at least one adaptation parameter to the acoustic feature vectors to yield transformed acoustic feature vectors;
   (d) decoding the transformed acoustic feature vectors to select a hypothesis therefrom corresponding to the received speech;
   (e) training the at least one adaptation parameter with acoustic feature vectors of the selected hypothesis to yield at least one trained adaptation parameter; and
   (f) determining whether a confidence score of the selected hypothesis from the decoding step (d) exceeds a minimum confidence score; and
   (g) storing the at least one trained adaptation parameter associated with the speech, if the confidence score of the selected hypothesis exceeds the minimum confidence score and, if not, then not storing the at least one trained adaptation parameter.

15. A method of speech recognition with characteristic-specific adaptation for a vehicle having a telematics unit with an embedded speech recognition system, the method comprising the steps of:
   (a) receiving speech;
   (b) pre-processing the speech to generate acoustic feature vectors;
   (c) applying at least one adaptation parameter to the acoustic feature vectors to yield transformed acoustic feature vectors;
   (d) decoding the transformed acoustic feature vectors to select a hypothesis therefrom corresponding to the received speech;
   (e) training the at least one adaptation parameter with acoustic feature vectors of the selected hypothesis to yield at least one trained adaptation parameter; and
   (f) observing the speech for a certain characteristic and saving the at least one trained adaptation parameter in accordance with the certain characteristic for use as at least one trained adaptation parameter in transforming feature vectors of subsequent speech having the certain characteristic, wherein the certain characteristic is speech type, such that step (f) comprises observing the speech for speech type including at least one of digit speech or command speech, saving the trained adaptation parameters associated with the speech as trained digit speech adaptation parameters when the speech is determined to be digit speech, and saving the trained adaptation parameters associated with the speech as trained command speech adaptation parameters when the speech is determined to be a command speech.

16. The method of claim 15, wherein the decoding step (d) further comprises using at least one of an acoustic model or a grammar developed specific to the certain characteristic of the speech.

17. The method of claim 15, wherein step (f) comprises observing the speech for user identity and using one or more adaptation parameters associated with the identity of the user.

18. A method of speech recognition with persistence of adaptation parameters for a vehicle having a telematics unit with an embedded speech recognition system, the method comprising the steps of:
   (a) receiving speech after an ignition event of the vehicle;
   (b) pre-processing a segment of the speech to generate acoustic feature vectors;
   (c) applying an adaptation parameter to the acoustic feature vectors to yield transformed acoustic feature vectors;
   (d) decoding the transformed acoustic feature vectors to select a hypothesis therefrom corresponding to the received speech; and
   (e) training the adaptation parameter with acoustic feature vectors of the selected hypothesis and saving the trained adaptation parameter for use in transforming feature vectors of another segment of speech received after a subsequent vehicle ignition event such that the trained adaptation parameter persists over vehicle ignition events so that the adaptation parameter need not be retrained upon every vehicle ignition event.

* * * * *